United States Patent [19]

Klaus

[11] Patent Number: 5,794,731
[45] Date of Patent: Aug. 18, 1998

[54] TENSIONING AND SHOCK-ABSORPTION DEVICE FOR THE IDLER WHEEL OF A TRACKED VEHICLE

[75] Inventor: Helmut Klaus, Hagen, Germany

[73] Assignee: Intertractor AG, Gevelsberg, Germany

[21] Appl. No.: 586,646

[22] PCT Filed: May 4, 1994

[86] PCT No.: PCT/DE94/00524

§ 371 Date: Jan. 2, 1996

§ 102(e) Date: Jan. 2, 1996

[87] PCT Pub. No.: WO95/02533

PCT Pub. Date: Jan. 26, 1995

[30] Foreign Application Priority Data

Jul. 16, 1993 [DE] Germany .............. 43 23 912.9
Sep. 11, 1993 [DE] Germany .............. 43 30 833.3

[51] Int. Cl.$^6$ .................................................. B62D 55/30
[52] U.S. Cl. .................................. 180/9.56; 305/146
[58] Field of Search ................. 180/9.1, 9.5, 9.54, 180/9.56; 305/143, 145, 146

[56] References Cited

U.S. PATENT DOCUMENTS

| | | | |
|---|---|---|---|
| 3,841,715 | 10/1974 | Comer, Jr. et al. | 305/146 |
| 3,980,351 | 9/1976 | Orr et al. | 305/149 |
| 4,413,862 | 11/1983 | Ragon | 305/146 |
| 4,580,850 | 4/1986 | Bissi et al. | 305/146 |

FOREIGN PATENT DOCUMENTS

| | | | |
|---|---|---|---|
| 40 25 929 A1 | 2/1992 | Germany | 305/146 |

*Primary Examiner*—Brian L. Johnson
*Assistant Examiner*—Avraham Lerner
*Attorney, Agent, or Firm*—Herbert Dubno; Yuri Kateshov

[57] ABSTRACT

A shock absorption device for an idler wheel of a tracked vehicle is provided between an outer mounting element fixed to a chassis and an inner mounting element operatively connected with the idler wheel and includes a spring mechanical unit suspended on the fixed element and a hydraulic unit supported on the lower mounting element and operatively connected with a free end of the spring unit.

6 Claims, 5 Drawing Sheets

TENSIONING AND SHOCK-ABSORPTION DEVICE FOR THE IDLER WHEEL OF A TRACKED VEHICLE

CROSS REFERENCE TO RELATED APPLICATIONS

This application is a national phase application of PCT/DE94/00524 filed 4 May 1994 and based in turn, on German national application P4323912.9 filed 16 Jul. 1993 and P4330833.3 filed 11 Sep. 1993 under the International Convention.

FIELD OF THE INVENTION

The invention relates to a tensioning and shock-absorption device for the idler wheel of a tracked vehicle.

BACKGROUND OF THE INVENTION

Such a device is known from EP 0 052 310 A1. In the known device it is required to create a countersupport for the hydraulic tensioning unit by means of a transverse frame which is rigidly connected with the vehicle chassis. This translates into a considerable construction expense, whereby in addition the overall dimensions of the entire assembly are enlarged.

From the DE-GM 90 11 884 a tensioning device for the idler wheel of a tracked vehicle is known, consisting of a hydraulic correcting element and a spring-tensioning device with pretensioned helical springs, whereby the tensioning device is fitted between mounting elements of the idler wheel and the mounting elements on the chassis side.

Thereby the hydraulic correcting element is a hydraulic cylinder, on whose piston a plunger is arranged, which projects towards the mounting elements of the idler wheel and can rest against them. At the cylinder end facing away from the idler wheel a feeding device for filling or emptying the cylinder chamber containing the hydraulic medium is provided. On the hydraulic cylinder end facing the idler wheel a stop plate is fastened to the outer cylinder wall, while at the hydraulic cylinder end facing away from the idler wheel a further stop plate is supported slidably towards a final stop plate. The helical spring is tensioned between the stop plates. In the desired mounting position the slidable stop plate rests with its side facing away from the helical spring against the mounting elements on the chassis side, whereby these mounting elements form a free space for the spring deflection of the hydraulic cylinder. Thereby the helical spring is arranged coaxially with the hydraulic cylinder which passes through it with slight play. The corresponding chamber of the hydraulic cylinder is filled with grease.

The slidable stop plate is thereby formed by a screw nut, which is screwed onto the hydraulic cylinder end provided with an outer thread, whereby the threading zone of the hydraulic cylinder corresponds to a multiple of the screw nut height. As a result the pretensioning of the helical spring can be changed. The stop plates also have radially projecting guide plates, which engage in guide ridges on the chassis side, so that they can slide in the longitudinal direction of the tensioning device and can not be radially rotated.

With such a device small overall dimensions are achieved, whereby it is also possible to make any repairs which might be needed in a defect tensioning device right on site, by emptying the hydraulic medium from the corresponding chamber of the hydraulic cylinder, so that afterwards the tensioning device can be dismounted from the machine chassis. By arranging the tensioning device in a corresponding auxiliary device, for instance a U-shaped mounting, the tensioning device can be relieved of load, so that the individual parts can be adjusted or also dismounted.

Although such a device has proven itself during operation, there is a drawback in the fact that such a device can be fitted or stored and delivered only with pretensioned helical springs, since the pretensioning of the helical springs has to be done in a special installation. This can lead to accidents caused by the considerably pretensioned helical springs, when they distend suddenly due to improper handling of device. Such a helical spring is pretensioned for instance with 160 to 190 kN.

OBJECT OF THE INVENTION

It is the object of the present invention to provide a device wherein the storage, transport and the fitting of the device can take place with an undertensioned spring unit that can be pretensioned only after the mounting of the device with untensioned spring unit and wherein the spring unit is pretensioned only after it is mounted.

SUMMARY OF THE INVENTION

In order to solve this problem it is proposed that the device be insertable with untensioned spring unit between the mounting elements of the idler wheel and the mounting elements of the vehicle chassis, that the hydraulic tensioning unit be supported with its plunger or its cylinder on mounting elements of the idler wheel, which rests against the chain of the vehicle.

Due to the construction of the invention it is possible to manufacture, store and transport and even to mount the device in the corresponding vehicle at first in an untensioned state. In such vehicles this applies usually to undercarriages of cranes, ramming equipment, excavators, ditch-digging equipment and the like.

The device which in the assembly stage is untensioned is introduced for the purpose of mounting into the corresponding mounting space between the mounting elements of the idler wheel and the vehicle chassis.

Thereby the spring unit rests on parts of the vehicle chassis with its first backing plate facing away from the idler wheel. By filling the chamber of the hydraulic cylinder, for instance with grease, the piston with the plunger is displaced, whereby the hydraulic tensioning unit is supported between mounting elements of the idler wheel and parts of the spring-tensioning unit. When the plunger advances, at first the idler wheel is pressed against the chain of the vehicle, whereby the chain forms a countersupport. At a further advance of the plunger of the hydraulic tensioning unit the enveloping chain prevents further movement of the idler wheel, so that as a reaction a force is initiated on the spring unit, whereby the spring unit is pretensioned. After sufficient pretensioning of the spring has been established, a blocking of the spring unit can take place in a suitable way, so that a return travel of the spring unit in the sense of relaxation is excluded. This way the spring unit is pretensioned and the entire device is able to function. For the purpose of dismounting the entire device, the hydraulic tensioning unit is actuated to the point that the plunger pretensions the spring unit to the extent that the locking element of the spring unit can be removed. After that the chamber of the hydraulic cylinder is evacuated, so that the plunger can return and the spring unit can relax. When the spring is completely relaxed and the chamber of the hydraulic cylinder is totally empty, then the complete device can be dismounted tension-free to be repaired or replaced.

A further development considered to be particularly advantageous consists in that the cylinder of the hydraulic tensioning unit is affixed to mounting elements of the running wheel and has a piston with a plunger projecting towards the spring unit. whereby on the side of the cylinder facing the idler wheel a feeding device is provided, for filling or emptying the chamber containing the hydraulic medium. that the spring unit consisting of the two backing plates and a helical spring is arranged coaxially with the plunger and rests with its first backing plate facing away from the plunger against mounting elements of the chassis and/or is affixed thereto, while the second backing plate can be directly or also indirectly supported against the frontal side of the plunger, and that a return stop which can be overridden by the second backing plate during pretensioning is releasably fastened to mounting elements of the vehicle.

It is considered as a preferred alternative when the hydraulic tensioning unit is concentrically surrounded by the spring unit, whereby the second backing plate is affixed on the cylinder end on the side of the idler wheel, the first backing plate is traversed by the cylinder with motion play and rests against mounting elements of the vehicle chassis or is fastened thereon, on the cylinder piston a plunger can slide towards the mounting elements of the idler wheel and rest against them, whereby on the piston side facing away from the plunger a device for filling and emptying of the cylinder with hydraulic medium is arranged, and that a return stop which during the pretensioning can be overridden by the second backing plate against the chain resting against the idler wheel is releasably fastened to the mounting elements of the chassis.

In order to achieve the object mentioned in the introduction it is proposed that the cylinder of the hydraulic tensioning unit be fastened to the mounting element of the idler wheel and that the mounting element be releasably fastened to the mounting element of a further idler wheel, that on the cylinder a sleeve with a bottom and a collar on the open side be sealingly guided and that a plunger sealingly guided in the cylinder be supported at its frontal side on the bottom of the sleeve, whereby the supply of the hydraulic medium is to be provided in a chamber at the bottom (mounting element) of the cylinder, that the second backing plate be an annular plate slipped over the sleeve and which rests against the collar, that the first backing plate be formed by a plate coaxial with the sleeve and the helical compression spring of the spring unit rests against the backing plates, and that the first backing plate be fastened to mounting elements of the vehicle chassis.

Due to the construction of the invention it is possible to manufacture, to transport and to store the device at first in an untensioned state, and also to mount it to the corresponding vehicle. This applies to vehicles such as the undercarriages of cranes, ramming equipment, excavators, ditch-digging equipment and the like. For the purpose of mounting, the device which in the assembly stage is untensioned, is introduced in the corresponding installation space between the mounting elements of the idler wheel and of the vehicle chassis. For this at first the first backing plate can be fastened to mounting elements of the vehicle chassis, for which these mounting elements have a mounting slot oriented transversely to the direction of the spring action, wherein the first backing plate can be inserted. The first backing plate can be secured in the slot for instance by a catch or the like. It is also possible to make the first backing plate in one piece with the mounting elements of the vehicle chassis or to connect it rigidly to the latter, as long as in principle it is meant to be equipped with a corresponding tensioning device.

Subsequently the cylinder of the hydraulic tensioning unit can be fastened with its corresponding mounting elements to the mounting elements of the idler wheel frame. Thereby the chamber for containing the hydraulic medium of the cylinder is emptied. In the cylinder there is the plunger and on the cylinder there is the sleeve together with the second backing plate and the fitted helical spring. After the parts have been arranged in their correct position, the hydraulic medium, preferably grease, can be fed into the chamber for containing the hydraulic medium, whereby the plunger is displaced in the cylinder in the direction of the first backing plate. The displacement of the plunger causes a concurrent entrainment of the sleeve, which in turn moves the second backing plate in the direction of the first backing plate. When the filling of the hydraulic cylinder chamber starts, first a the mounting element connected with the idler wheel is displaced, so that the idler wheel is pressed against the chain of the respective vehicle. In the tensioned state the chain constitutes a countersupport. As the filling of the hydraulic chamber continues the plunger together with the sleeve and the second backing plate is moved towards the first backing plate, whereby the helical compression spring, which rests against the two backing plates, is pretensioned. After sufficient pretensioning of the spring has been achieved, the spring unit can be blocked in a suitable way, so that a return motion of the spring unit in the sense of relaxation is prevented. Preferably this takes place due to the fact that the second backing plate is blocked and locked against back travel by mechanical means. For that a locking element can be inserted between the corresponding mounting elements of the chassis and be held captive in a suitable way, which prevents the retraction of the backing plate. This way the spring unit is pretensioned and the entire device is ready to function.

For the purpose of dismounting the entire device, the hydraulic tensioning unit is actuated to the point that the plunger by means of the spring unit advances so far that the locking of the second backing plate can be removed. After that the chamber of the hydraulic cylinder is emptied, so that the plunger moves back and the spring unit can relax. When the spring is completely relaxed and the hydraulic cylinder chamber is extensively or completely emptied, the complete device can then be dismounted tension-free, repaired or replaced.

The solution proposed by the invention also makes possible to dismount merely the hydraulic aggregate of the device for the purpose of repair or maintenance, in that the mechanism preventing the spring unit from travelling back, particularly the back-run lock of the second backing plate remains installed and the chamber of the hydraulic cylinder is emptied, so that the plunger moves back. Due to the return motion of the plunger the sleeve located on the cylinder can also be moved back. This way the entire hydraulic unit can be removed, while the spring unit remains in tensioned state on the vehicle chassis.

The construction according to the invention has the additional advantage that due to the selected arrangement and construction the overall dimensions of the device can be kept very small, so that the required installation space is only slightly bigger than the fitting length of the untensioned spring.

A preferred further development is seen in that the first backing plate has a centering collar or the like centering element on its side facing the sleeve bottom for the corresponding end of the helical compression spring.

BRIEF DESCRIPTION OF THE DRAWING

The above and other objects, features, and advantages will become more readily apparent from the following description, reference being made to the accompanying drawing in which.

Embodiment examples of the invention are shown in the drawing and are subsequently closer described. It shows.

SPECIFIC DESCRIPTION

Figure 1:
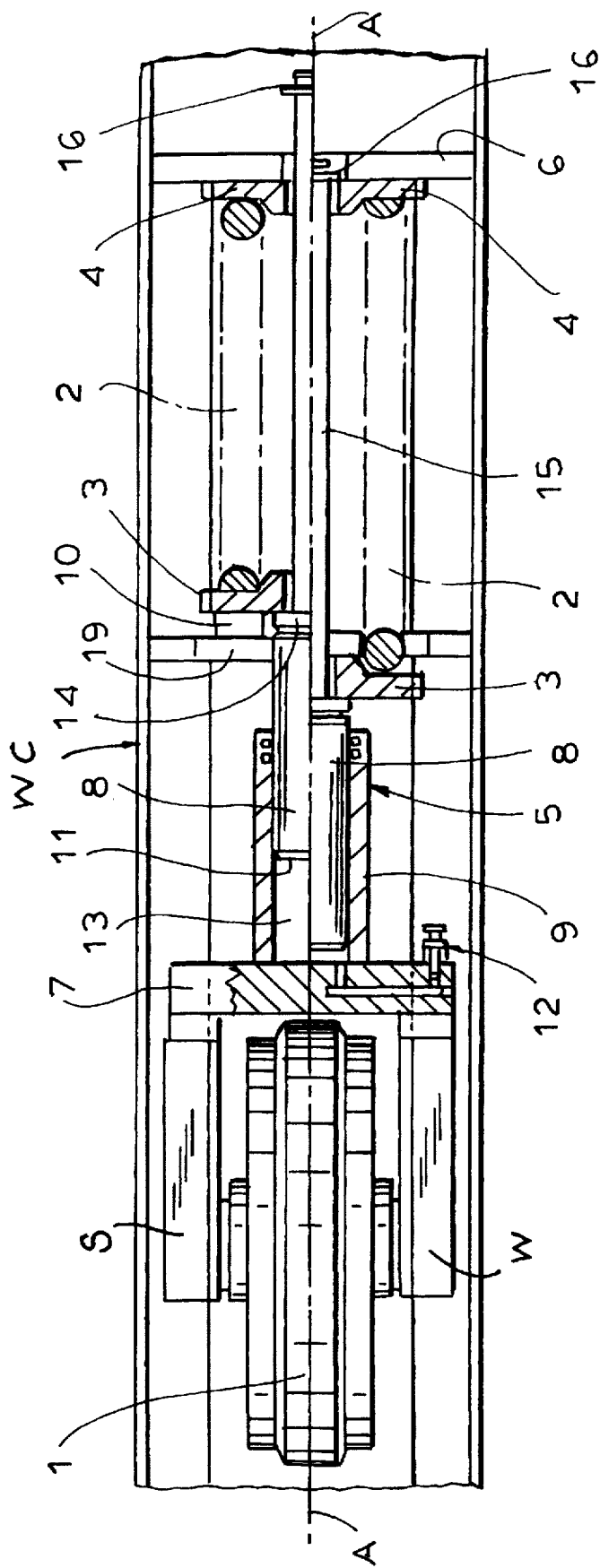
FIG. 1 is a top view of a device according to the invention, in untensioned and in tensioned state.

The tensioning and shock absorption device for an idler wheel 1 of tracked vehicles consists of a mechanical suspension unit with a helical spring 2 and first and second face or backing plates 3, 4, as well as a hydraulic tensioning unit 5. The device can be fitted between the mounting plates or elements 6 of the vehicle chassis WC (FIG. 1) and mounting elements 7 of the idler wheel 1 mounted on a wheel support S and rotatable about a wheel axis W which extends perpendicular to a chassis axis A. The device is fitted with untensioned spring unit 2, 3 between the mounting elements 7 of the idler wheel and the mounting elements 6 of the vehicle chassis, as can be seen from the lower half of FIG. 1 and the lower half of FIG. 3. Thereby the spring unit 2, 3, 4 rests with the first backing or first face plate 4 facing away from the idler wheel 1 against parts of the vehicle chassis 6. It can be fixed in this position. In this position takes place a pretensioning of the spring unit by means of hydraulic displacement of the second backing or second face plate 3 by the hydraulic tensioning unit 5, which rests with its plunger 8 or its cylinder 9 against the mounting elements 7 of the idler wheel, which in turn rests against the chain of the vehicle (not shown). When the plunger 8 advances, the helical spring 2 is pretensioned by the second backing plate. After a corresponding displacement of the backing plate 3, a position is reached wherein it becomes possible to lock the backing plate 3 against back travel.

Figure 2:
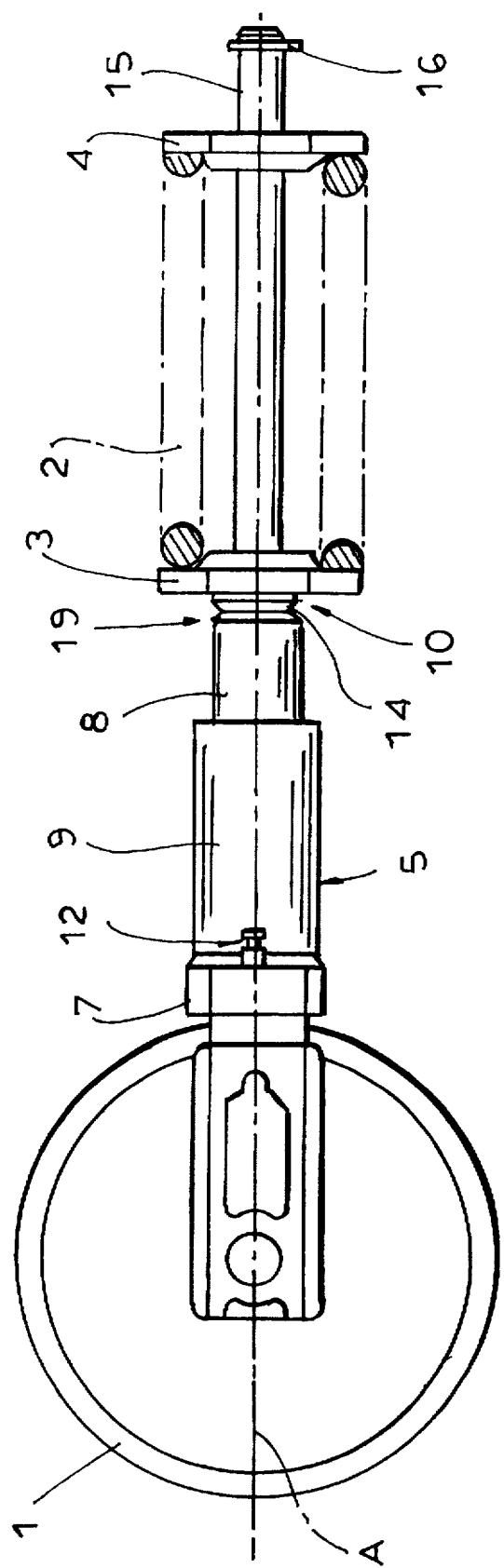
FIG. 2 is a side view of the device in the tensioned state.

For this purpose between the mounting elements 19 of the chassis a locking element 10 is irretrievably mounted in a suitable manner, which prevents the back travel of the backing plate 3. The plunger 8 can then travel back, until the backing plate rests on the locking element 10 and this in turn rests against the mounting part or chassis support WC. In the embodiment of FIGS. 1 and 2 the cylinder 9 of the hydraulic tensioning unit 5 is affixed to the mounting elements 7 of the running wheel, particularly through welding. The hydraulic tensioning unit 5 has a piston 11 with a plunger 8 projecting towards the spring unit 2, 3, 4. On the side of the cylinder 9 facing the idler wheel 1 a feeding device 12 is provided for filling or emptying the chamber 13 containing the hydraulic medium (for instance grease). The spring unit consisting of the two backing plates 3, 4 and a helical compression spring 2 is arranged coaxially with the plunger 8 and rests with the first backing plate 4 facing away from the plunger 8 against the mounting elements 6 of the vehicle chassis. The backing plate 4 can also be inserted in a corresponding pocket or the like of the mounting frame 6. The second plate 3 can rest against the frontal side of the plunger 8, directly or indirectly via a head plate 14 of a bolt 15 guided coaxially through the spring unit. During the filling of chamber 13 the plunger is pushed forward (in the drawing FIG. 1 from the position shown at the bottom to the position shown at the top), whereby the helical compression spring 2 is pretensioned. After overriding a position wherein the space for receiving a back stop element 10 is freed, a back stop 10 which rests against the mounting elements 19 of the chassis can be releasably inserted in this position. The plunger 8 can then be retracted by slightly emptying the chamber 13, until the position shown in the upper half of FIG. 1 is reached. In this position the device is ready to function.

At the end of rod or bolt 15 facing away from the head 14, a snap ring 16 is arranged to prevent loosing, which when the helical spring 2 is relaxed, can be supported against the rear side of the backing plate 4, but which must not take up any load.

The bolt 15 serves merely to prevent the spring tensioning unit from bending out and to insure the coaxial arrangement of the backing plates 3 and 4.

Figure 3:
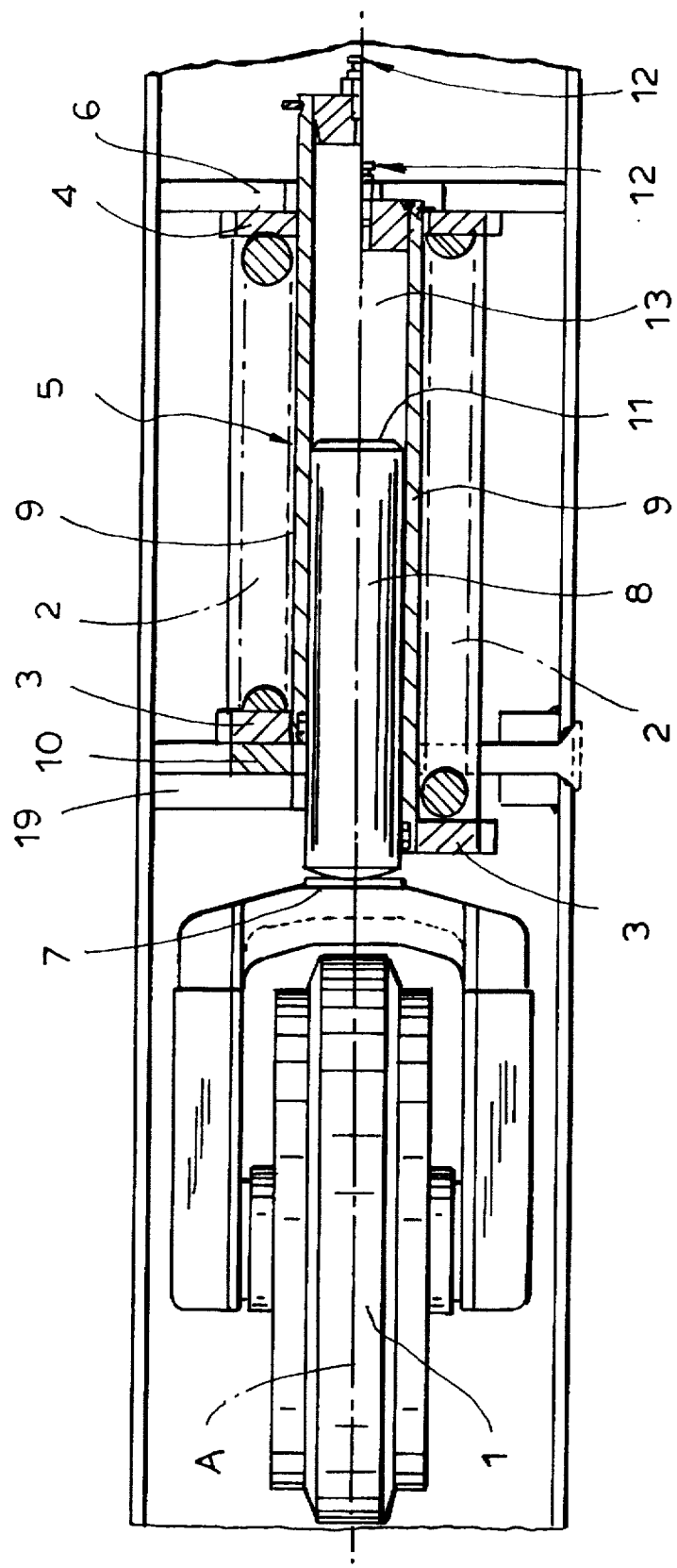
FIG. 3 is an alternative embodiment in the view according to FIG. 1.
Figures 4, 5:
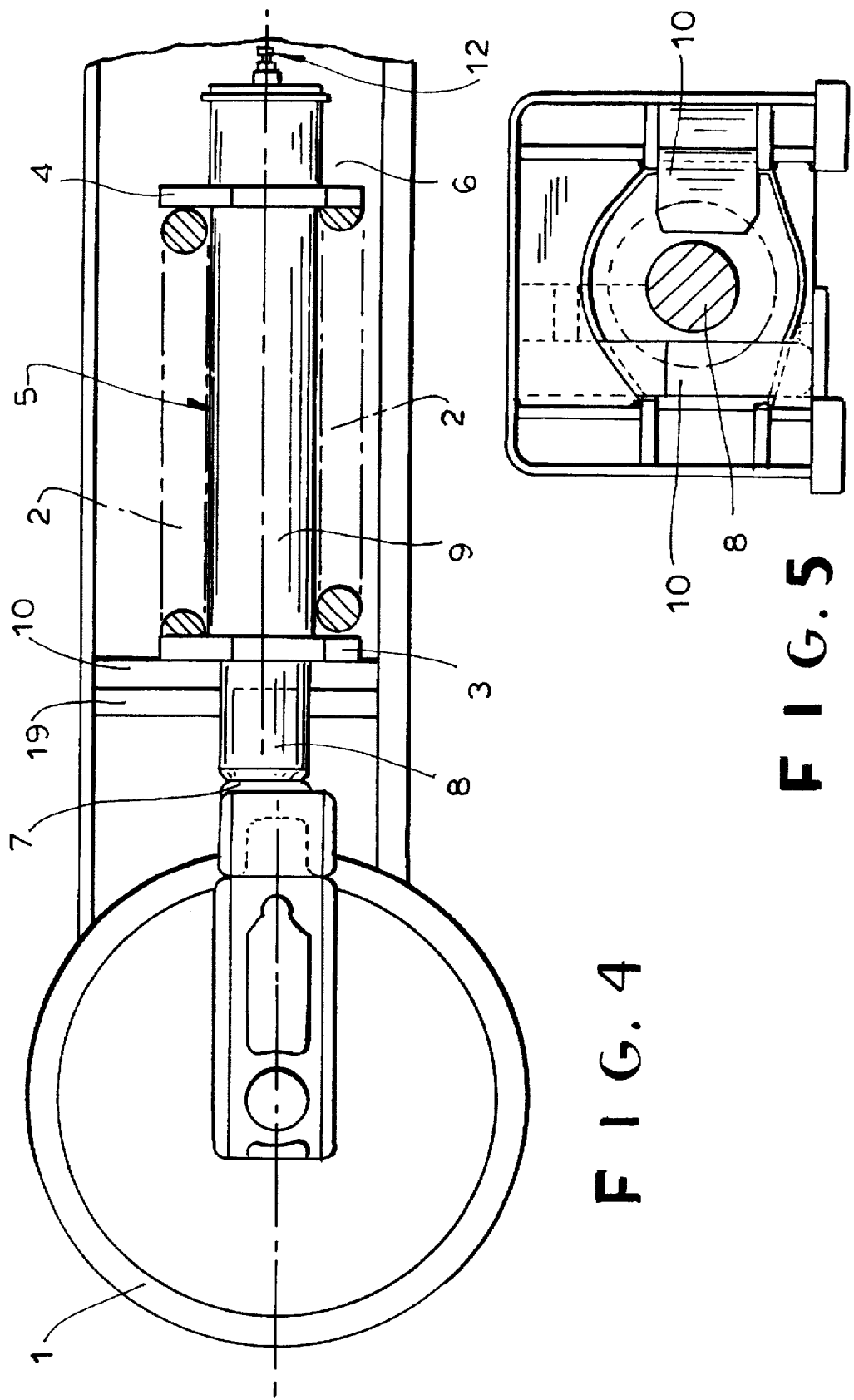
FIG. 4 is the device according to FIG. 3 in the view according to FIG. 2.
FIG. 5 is the device according to FIG. 4 seen in a section V—V.

In the embodiment example according to FIGS. 3–5, the hydraulic tensioning unit 5 is concentrically surrounded by the spring unit, whereby the second backing plate 3 is affixed to the idler-wheel end of the cylinder 9, particularly is welded thereto, while the backing plate 4 is traversed with motion play by the cylinder 9. It rests against mounting elements 6 of the chassis. On the piston 11 of the cylinder 9 a plunger 8 can advance towards the mounting elements 7 of the idler wheel 1 and can rest against it. On the side of the piston 9 facing away from the plunger 8 a device 12 for filling and emptying the chamber 13 of the cylinder 9 is provided. The helical compression spring 2 is coaxially traversed by the cylinder 9. In order to mount the device the position according to the lower half of FIG. 3 is assumed. This way the device can be inserted in the corresponding mounting space. Subsequently the chamber 13 is filled with the hydraulic medium (grease), so that the plunger 8 advances in the direction of the idler wheel 1, particularly towards the surface 7. As soon as the idler wheel 1 rests against the corresponding vehicle chain, a reaction force builds up, which leads to the fact that during a further filling of the chamber 13, the cylinder 9 is pushed back from its position according to the lower half of FIG. 3 into the position shown in the upper half of FIG. 3. After overriding the back-travel locking position, a corresponding locking element 10 can be stuck or slid into the gap between the stop plate 3 and the mounting part A, so that the back travel of the plate 3 is prevented, this way the helical compression spring 2 remains pretensioned. By a slight return motion of the plunger 8 (by partially emptying the chamber 13) the target position shown in the upper half of FIG. 3 is reached. Thereby the device is ready to operate. For dismounting the device, the process can take place analogously in reverse, so that then the tension-free removal of the device is possible.

In FIG. 5 various locking elements 10 are shown, which in the embodiment shown on the left in FIG. 5 are insertable in an insertion channel open at the top, this way leading to a blockage of the axial displacement of the backing plate 3, while in the embodiment shown to the right in FIG. 5 the locking element 10 is slid in through a lateral insertion channel formed in the plunger 8.

By using locking elements of various thickness different degrees of pretensioning of the spring tensioning unit can be reached.

As a result the invention offers a device which allows the mounting and dismounting of the device in an untensioned state, whereby preliminary tensioning of the spring tensioning unit and the readiness to operate can be achieved in the simplest manner.

Figure 6:
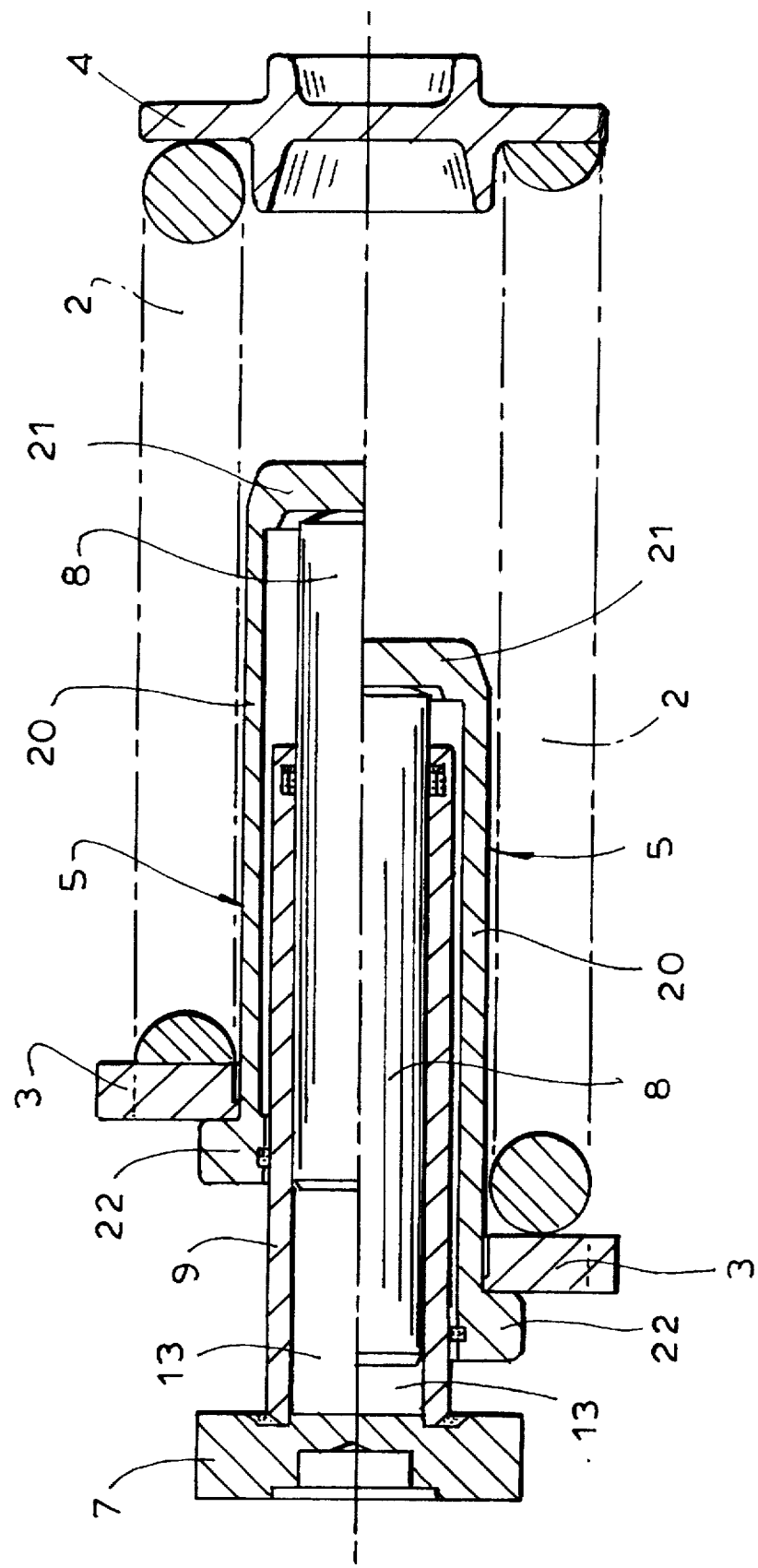
FIG. 6 is the essential parts of a device according to the invention in a side view, seen in a median longitudinal section.

In the embodiment according to FIG. 6 the tensioning and shock-absorption device for an idler wheel of tracked vehicles consists of a mechanical suspension unit with a helical spring 2 and backing plates 3, 4, as well as a hydraulic tensioning unit 5. The hydraulic tensioning unit 5 consists of a plate (7) which can be fastened to a mounting element of the idler wheel, which preferably comprises a device for feeding hydraulic medium into the hydraulic tensioning unit. A cylinder 9 of the hydraulic tensioning unit is fastened to this plate 7, for instance by welding. In the cylinder 9 a plunger 8 is sealingly guided, while on the outer surface of cylinder 9 a sleeve 20 is sealingly guided, which has a bottom 21 and a collar or flange 22 at the open end. This device can be fitted between the mounting element of the vehicle chassis and the mounting elements of the idler wheel. For this purpose the device with untensioned spring unit is inserted, as shown in the lower half of the drawing figure, between the mounting elements of the idler wheel and mounting elements of the vehicle chassis, whereby the corresponding mounting elements of the vehicle chassis is formed by the thereon fastened first backing plate 4. Thereby the helical spring 2 rests against the first backing plate 4 and against the second backing plate 3. The plate 7 is fastened on mounting elements of the idler wheel. After the parts have been accurately fastened and positioned, a pretensioning of the spring unit takes place by means of hydraulic displacement of the second backing plate 3 caused by the hydraulic tensioning unit 5, which rests with its cylinder 9 against mounting elements 7 of the idler wheel, which in turn rests on the vehicle chain. When the plunger 8 is actuated by pressure, at first the idler wheel is pretensioned against the chain and subsequently the idler wheel in this pretensioned position is used as a countersupport, so that when the plunger is further hydraulically advanced the sleeve 20 and via the collar 22 the backing plate 3 is entrained, whereby the helical spring 2 is pretensioned against the backing plate 4. After a corresponding displacement of the sleeve 20 together with the backing plate 3, a position is reached wherein it is possible to lock the stop plate 3 against back travel. For this purpose a locking element is inserted between the mounting elements of the chassis and irretrievably mounted in a suitable manner, which prevents the stop plate 3 from back travel. The plunger 8 can then be retracted, until the stop plate 3 rests against the corresponding locking element 10, and this in turn rests against a corresponding mounting element.

Due to the invention a device is made available which allows to mount and dismount the device in an untensioned state, whereby the pretensioning of the spring unit and its readiness to operate can be achieved in the simplest manner. Thereby the overall dimensions of the device are only slightly bigger than the length of the helical compression spring 2 in a relaxed state.

The invention is not limited to the embodiment examples, but is multiply variable within the framework of the invention.

All novel individual and combined features disclosed in the specification and/or the drawing are considered essential parts of the invention.

I claim:

1. A shock absorption device mounted to a track-laying vehicle chassis comprising:
    a vehicle chassis having a chassis axis;
    an idler wheel rotatable about a wheel axis extending horizontally perpendicular to the chassis axis;
    a wheel support carrying the idler wheel;
    a mounting plate spaced from the wheel support and fixed on the chassis;
    spring means extending along the chassis axis for spring-mounting of the idler wheel and including:
        a first face plate lying against the mounting plate,
        a second face plate spaced axially from the first face plate, and
        a helical spring braced between the face plates;
    stressing means for compressing the spring and including:
        a piston and cylinder unit having a cylinder mounted on the wheel support and a piston reciprocally axially displaceable between a retracted position thereof corresponding to a relaxed state of the spring and an extended position of the piston corresponding to a compressed state of the spring, said piston being braced against said second face plate, and
        hydraulic means mounted on the wheel support for actuating the piston, the piston being operative to compress the spring and displace the second face plate toward the first face plate; and
    lock means for preventing expansion of the spring upon reaching a desired compression of the spring and removably inserted between the second face plate and the chassis.

2. The device defined in claim 1 wherein the chassis is formed with a chassis support mounted between the wheel support and mounting plate and supporting the lock means upon insertion, the chassis support being traversed by the second face plate upon actuation of the piston.

3. The device defined in claim 1 wherein the first face plate is traversed by a rod connected to the piston.

4. The device defined in claim 2 wherein the lock means is sandwiched between the chassis support and the second face plate.

5. The device defined in claim 2, further comprising a sleeve coaxial with the piston and mounted on an upper end of the piston and extending axially downwardly therefrom and terminating with a flange which extends radially outwardly from the sleeve and supports the second face plate, the lock means being sandwiched between the chassis support and a side of the flange facing the chassis support upon reaching the desired precompression.

6. The device defined in claim 1 wherein the wheel support and the mounting plate are coaxial with the piston and cylinder unit, the hydraulic means being mounted on the wheel support and provided with means for conveying a hydraulic liquid inside the cylinder of the piston and cylinder unit.

* * * * *